(12) United States Patent
Sylvain

(10) Patent No.: US 10,007,925 B2
(45) Date of Patent: Jun. 26, 2018

(54) LOCAL ADVERTISEMENT INSERTION THROUGH WEB REQUEST REDIRECTION

(75) Inventor: Dany Sylvain, Gatineau (CA)

(73) Assignee: GENBAND US LLP, Plano, TX (US)

( * ) Notice: Subject to any disclaimer, the term of this patent is extended or adjusted under 35 U.S.C. 154(b) by 471 days.

(21) Appl. No.: 13/039,290

(22) Filed: Mar. 2, 2011

(65) Prior Publication Data

US 2012/0226819 A1 Sep. 6, 2012

(51) Int. Cl.
*G06F 15/16* (2006.01)
*G06Q 30/02* (2012.01)

(52) U.S. Cl.
CPC ................................. *G06Q 30/0241* (2013.01)

(58) Field of Classification Search
USPC ........ 709/245, 203, 217, 224, 226, 240, 244
See application file for complete search history.

(56) References Cited

U.S. PATENT DOCUMENTS

| | | | | |
|---|---|---|---|---|
| 7,840,645 B1* | 11/2010 | Chase et al. | | 709/217 |
| 7,987,194 B1* | 7/2011 | Walker | | G06Q 30/0251 |
| | | | | 705/14.49 |
| 8,438,184 B1* | 5/2013 | Wang | | H04L 67/02 |
| | | | | 707/780 |
| 8,738,437 B2* | 5/2014 | Gailey et al. | | 705/14.41 |
| 2001/0051517 A1* | 12/2001 | Strietzel | | 455/414 |
| 2005/0096979 A1* | 5/2005 | Koningstein | | 705/14 |
| 2005/0114324 A1* | 5/2005 | Mayer | | G06F 17/30991 |
| 2005/0235044 A1* | 10/2005 | Tazuma | | 709/217 |
| 2006/0029040 A1* | 2/2006 | Sherman et al. | | 370/352 |
| 2007/0088801 A1* | 4/2007 | Levkovitz et al. | | 709/217 |
| 2008/0033794 A1 | 2/2008 | Ou et al. | | |
| 2008/0033814 A1* | 2/2008 | Carignano | | 705/14 |
| 2008/0040224 A1* | 2/2008 | Roker | | 705/14 |
| 2008/0215437 A1* | 9/2008 | Levy | | G06Q 30/02 |
| | | | | 705/14.54 |
| 2008/0222283 A1* | 9/2008 | Ertugrul et al. | | 709/224 |
| 2008/0270521 A1* | 10/2008 | Shen et al. | | 709/203 |
| 2008/0281699 A1* | 11/2008 | Whitehead | | 705/14 |
| 2008/0281941 A1 | 11/2008 | Park et al. | | |
| 2009/0048900 A1* | 2/2009 | Moore | | 705/10 |
| 2009/0049469 A1 | 2/2009 | Small et al. | | |
| 2009/0055267 A1 | 2/2009 | Roker | | |
| 2009/0073885 A1 | 3/2009 | Jalil et al. | | |
| 2009/0138447 A1 | 5/2009 | Kalavade | | |
| 2009/0144145 A1 | 6/2009 | Yoon et al. | | |
| 2009/0147778 A1* | 6/2009 | Wanless et al. | | 370/389 |
| 2009/0186635 A1* | 7/2009 | Vieri | | 455/466 |
| 2009/0187939 A1* | 7/2009 | Lajoie | | G06Q 30/02 |
| | | | | 725/34 |
| 2009/0298480 A1* | 12/2009 | Khambete et al. | | 455/414.1 |
| 2009/0309711 A1* | 12/2009 | Adappa et al. | | 340/501 |

(Continued)

OTHER PUBLICATIONS https://www.techopedia.com/definition/24973/deep-packet-inspection-dpi.*

*Primary Examiner* — Michael Y Won
(74) *Attorney, Agent, or Firm* — Fogarty LLP

(57) ABSTRACT

According to one aspect, the subject matter described herein includes a method for communicating advertisement information. The method includes steps occurring at a packet inspection node. The method also includes monitoring data packets associated with a user. The method further includes detecting a local advertisement request within the data packets. The method further includes redirecting the request to a local advertisement server.

27 Claims, 6 Drawing Sheets

(56) References Cited

U.S. PATENT DOCUMENTS

| | | | |
|---|---|---|---|
| 2010/0036970 A1* | 2/2010 | Sidi et al. .................... 709/245 |
| 2010/0114706 A1* | 5/2010 | Kosuru ...................... 705/14.55 |
| 2010/0153991 A1* | 6/2010 | Pandey .......................... 725/34 |
| 2010/0262472 A1* | 10/2010 | Gautam et al. ............. 705/14.1 |
| 2010/0306039 A1* | 12/2010 | Green et al. ................. 705/14.4 |
| 2010/0312706 A1 | 12/2010 | Combet et al. |
| 2011/0295683 A1* | 12/2011 | Mak .................. G06Q 30/0251 705/14.49 |
| 2012/0005016 A1* | 1/2012 | Graff ................. G06Q 30/0242 705/14.49 |
| 2012/0030039 A1* | 2/2012 | Fernandez Gutierrez . 705/14.73 |
| 2013/0111328 A1* | 5/2013 | Khanna et al. ............... 715/234 |
| 2013/0211912 A1* | 8/2013 | Kim et al. ................. 705/14.53 |
| 2014/0317112 A1* | 10/2014 | Maharajh et al. ............ 707/736 |

* cited by examiner

LOCAL ADVERTISEMENT INSERTION THROUGH WEB REQUEST REDIRECTION

TECHNICAL FIELD

The subject matter described herein relates to the insertion of local advertisements through web request redirection. More specifically, the subject matter relates to methods, systems, and computer readable media for local advertisement insertion through web request redirection.

BACKGROUND

Many web sites rely on advertisements to generate revenue. Often, such advertisements are provided to web sites by advertising aggregators (AAs). An AA functions as a liaison between firms seeking to distribute promotional messages and web sites desiring a central supplier of advertisements.

Many AAs utilize various models to select an advertisement appropriate for a requesting web site. For example, an AA may generate profiles for each advertisement within its repertoire and each potential destination web site. When a web site requests an advertisement, the AA compares the profile of the requesting web site with the various profiles in its advertisement collection in order to identify an appropriate advertisement for the requesting web site.

So-called "optimized advertising models," however, have various shortcomings. Often, the advertisement selection is based on profile data derived from the destination web site and not further refined to account for user interests. Moreover, such models commonly are designed to be used by firms employing a national or international marketing campaign and fail to address the needs of firms seeking to target a limited geographic region they serve.

Accordingly, a need exists for methods, systems, and computer readable media for local advertisement insertion through web request redirection.

SUMMARY

According to one aspect, the subject matter described herein includes a method for communicating advertisement information. The method includes steps occurring at a packet inspection (PI) node. The method also includes monitoring data packets associated with a user. The method further includes detecting a local advertisement request within the data packets. The method further includes redirecting the request to a local advertisement server.

According to another aspect, the subject matter described herein includes a system for communicating advertisement information. The system includes a PI node. The PI node includes a communications interface. The PI node further includes an inspection module configured to monitor data packets associated with a user and detect a local advertisement request within the data packets. The PI node further includes a local advertisement module configured to redirect the request to a local advertisement server.

As used herein, the term "node" refers to a physical computing platform including one or more processors and memory.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
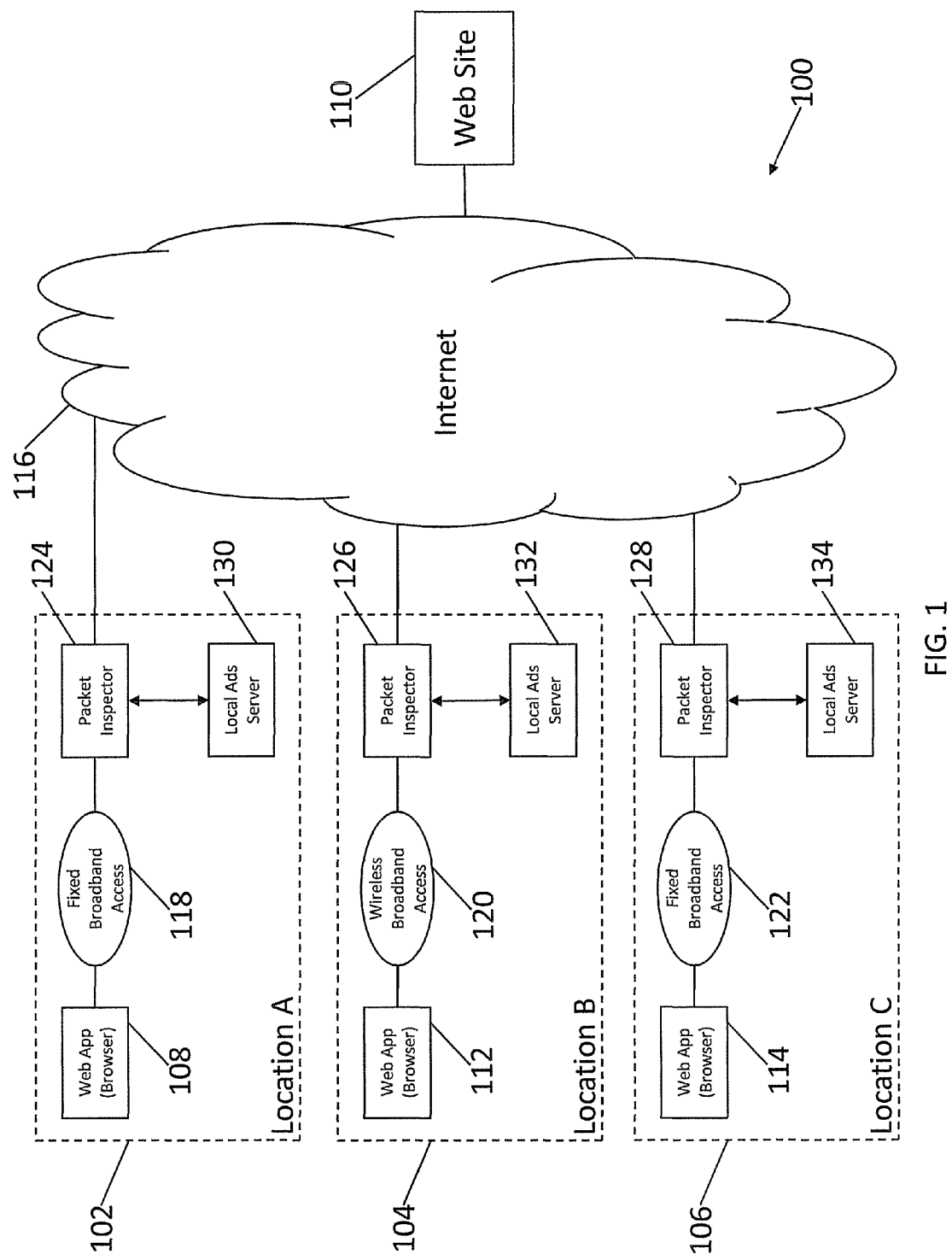
FIG. 1 is a network diagram illustrating an exemplary network environment for local advertisement insertion through web request redirection according to an embodiment of the subject matter described herein.

Methods, systems, and computer readable media for local advertisement insertion through web request redirection are provided. FIG. 1 is a network diagram illustrating an exemplary network environment for local advertisement insertion through web request redirection according to an embodiment of the subject matter described herein. Referring to FIG. 1, network environment 100 may include various geographic regions. For example, network environment 100 includes locations 102, 104, and 106. Within a given location a user may utilize a web application node (e.g., a node having a web browser) to view and/or interact with content provided by a web site node. For example, a user at location 102 may utilize web application node 108 to view and/or interact with content provided by web site node 110. Similarly, users located at locations 104 and 106 may respectively utilize web application nodes 112 and 114 to view and/or interact with content provided by web site node 110. Data associated with communications between a web application and a web site may take the form of packets and traverse one or more networks. For example, data packets associated with communications between web application node 108 and web site node 110 may traverse Internet 116 and/or a carrier network serving location 102. Similarly, data packets associated with communications between web site node 110 and web application nodes 112 and 114 may respectively traverse Internet 116 and/or carrier networks serving locations 104 and 106.

Web applications may communicate with web sites via various types of access networks, e.g., fixed, wired, wireless, or mobile networks. For example, web application node 108 may connect with web site node 110 via fixed broadband access network 118. Similarly, web application nodes 112 and 114 may respectively connect with web site node 110 via wireless broadband access network 120 and fixed broadband access network 122. A PI node may exist along a communication path between a web application and a web site. For example, PI node 124 may lie along a path utilized by communications between web site node 110 and web application node 108. Similarly, PI nodes 126 and 128 may respectively lie along paths utilized by communications between web site node 110 and web application nodes 112 and 114. A PI node may perform inspection on the payload of a packet for which it is not an endpoint. That is, a PI node may view non-routing information (e.g., non-header information) within a packet that the PI node neither created nor is the intended recipient of. For example, PI node 124 may view non-header information contained in a packet generated by web site node 110 and destined for web application node 108. Similarly, PI nodes 126 and 128 may respectively view non-header information contained in packets generated by web site node 110 and respectively destined for web application nodes 112 and 114. Additionally, in accordance with an embodiment of the subject matter described herein, a PI node may communicate with a local advertisement server (LAS). For example, PI node 124 may communicate with LAS 130. Similarly, PI nodes 126 and 128 may respectively communicate with LASs 132 and 134.

A PI node may exist within a given geographic proximity of a web application node. For example, PI node 124 may be located, along with web application node 108, within location 102. Similarly, PI nodes 126 and 128 may be respectively located, along with web application nodes 112 and 114, in locations 104 and 106. The proximity of a PI node to a web application node may be utilized in accordance with embodiments of the subject matter described herein for local advertisement insertion through web request redirection. For example, web site node 110 may insert a local advertisement trigger into a data exchange between itself and web application node 108. Similarly, web site node 110 may insert the same local advertisement trigger into data exchanges between itself and web application nodes 112 and 114. When web application node 108 loads the local advertisement trigger, a local advertisement request is generated and sent to web site node 110. PI node 124 may detect the local advertisement request among the packets exchanged between web site node 110 and web application node 108. PI node 124 may redirect the local advertisement request to LAS 130. LAS 130 may select an appropriate advertisement and communicate it to PI node 124. PI node 124 may communicate the local advertisement to web application node 108.

Similarly, when web application nodes 112 and 114 load the local advertisement trigger they will generate local advertisement requests which PI nodes 126 and 128 may respectively detect among the packets exchanged between web site node 110 and web application nodes 112 and 114. PI nodes 126 and 128 may respectively redirect the requests to LASs 132 and 134. LASs 132 and 134 may select appropriate advertisements and communicate their selections to PI nodes 126 and 128. PI nodes 126 and 128 may respectively communicate the local advertisements to web application nodes 112 and 114. The local advertisement selected by each of LASs 130, 132, and 134 need not be the same. Thus, the approach enables web site node 110 to communicate a common advertisement trigger to web application nodes 108, 112, and 114, while resulting in each of web application nodes 108, 112, and 114 receiving a different advertisement. Moreover, given that PI nodes 124, 126, and 128 are respectively co-located with web application nodes 108, 112, and 114 within locations 102, 104, and 106, the local advertisement selected may be based on the geographic location of the web application to which it is to be communicated.

Figure 2:
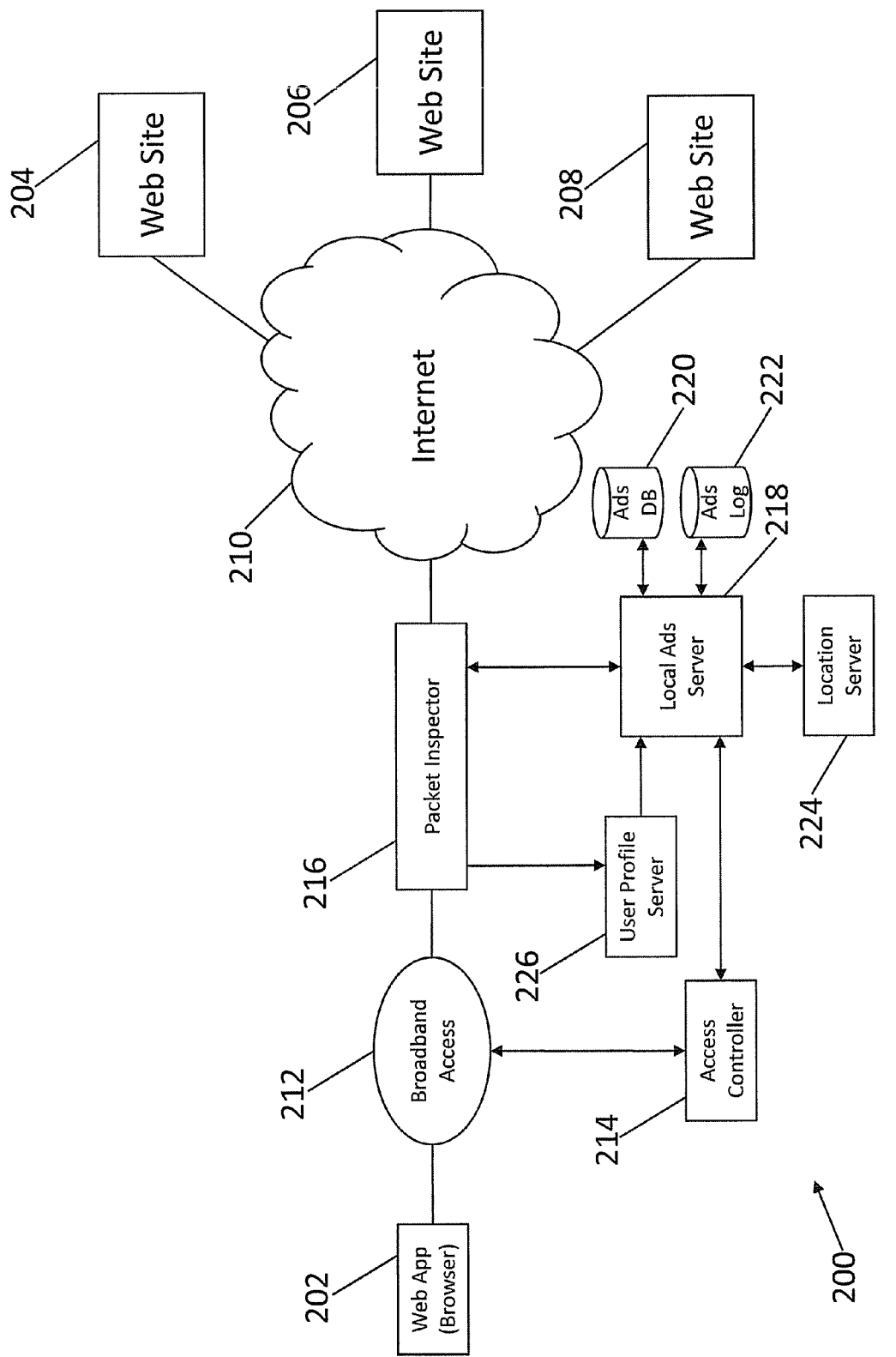
FIG. 2 is a network diagram illustrating an alternate network environment for local advertisement insertion through web request redirection according to an embodiment of the subject matter described herein.

FIG. 2 is a network diagram illustrating an alternate network environment for local advertisement insertion through web request redirection according to an embodiment of the subject matter described herein. Referring to FIG. 2, network environment 200 may include a web application node 202. Web application node 202 may be any node capable of communicating with a network host. For example, web application node 202 may be a computer, mobile phone, tablet device, set top box, television, or streaming media device. A user may utilize web application node 202 to communicate with a web site or content provider. For example, web application node 202 may communicate with web site nodes 204, 206, and 208. Data associated with communications between web application node 202 and web site nodes 204, 206, and 208 may take the form of packets and traverse one or more networks. For example, data packets associated with communications between web application node 202 and web site node 206 may traverse Internet 210 and/or a carrier network serving application node 202.

Web application nodes may communicate with web sites via various types of access networks, e.g., fixed, wired, wireless, or mobile networks. For example, web application node 202 may communicate with web site node 206 via broadband access network 212. Access networks may contain and/or be managed by access controller nodes. For example, broadband access network 212 is managed by access controller node 214. Access controller node 214 may serve as a central decision point for access points throughout the access network, provide authentication and authorization services, implement quality of service (QoS) policies, provide bandwidth management, and increase security. As a central decision point for access points in the access network, access controller node 214 may maintain and/or have access to information identifying users of the access network and details relating to their connection type. For example, access controller node 214 may have tables relating a user id and/or a web application node address with any of a digital subscriber line (DSL) loop, a fiber optic connection, a coaxial cable connection, a wireless connection, a wireless cell, or a wireless sector.

A PI node may exist along a communication path between a web application node and a web site node. For example, PI node 216 may exist along a communication path between web application node 202 and web site node 206. PI node 216 may perform inspection on the payload of a packet for which it is not an endpoint. That is, PI node 216 may view non-routing information (e.g., non-header information) within a packet that the PI node neither created nor is the intended recipient of. For example, PI node 216 may view non-header information contained in a packet generated by web site node 206 and destined for web application node 202. In accordance with embodiments of the subject matter described herein, PI node 216 may detect a local advertisement request. For example, PI node 216 may detect a local advertisement request among data packets exchanged between web application node 202 and web site node 206. Once detected, the local advertisement request may be redirected by PI node 216 to another node. For example, PI node 216 may redirect the request detected among data packets exchanged between web application node 202 and web site node 206 to LAS 218. In one embodiment, PI node 216 may "spoof" web application node 202 so that PI node 216 appears to web application node 202 as web site node 206. PI node 216 may further "spoof" web site node 206 so that PI node 216 appears to web site node 206 as web application node 202. Utilization of such an embodiment may increase performance by enabling web application node 202 to continue existing transactions (e.g., an HTTP GET exchange) with web site node 206.

In accordance with embodiments of the subject matter described herein, a PI node may communicate with an LAS. For example, PI node 216 may communicate with LAS 218. LAS 218 may be any device capable of storing and/or communicating digital advertisements. For example, LAS 218 may be a web server configured to store and/or communicate advertisement information. LAS 218 may be utilized by PI node 216 to provide advertisement information to a web application node. For example, LAS 218 may be utilized by PI node 216 to provide advertisement information to web application node 202. LAS 218 may have and/or access an advertisement database (DB) for storing advertisements to potentially be communicated to web application nodes. For example, LAS 218 may have and/or access advertisement DB 220 for storing advertisements to potentially be communicated to web application node 202. LAS 218 may also have and/or access an advertisement log for tracking the communication of advertisements to web application nodes. For example, LAS 218 may have and/or access advertisement log 222. Advertisement log 222 may include information such as: the provider of the advertisement; the dates of its communication; the identity of the LAS that was utilized; the web site from which the trigger was communicated; the web application node(s) to whom the advertisement has been communicated; information identifying users of the web application node to which the advertisement has been communicated; and whether, how often, and/or by whom the advertisement has been interacted with. For example, advertisement log 222 may include information indicating that an advertisement has been communicated, by LAS 218, to web application node 202, the particular user utilizing web application node 202 at the time of communication, the web site that triggered the advertisement request, the provider of the advertisement, and whether the user interacted with the advertisement.

LAS 218 may be configured to communicate with a location server. For example, LAS 218 may be configured to communicate with location server 224. Location server 224 may contain information relating users, subscribers, network topology information, and information corresponding with the geographic location of users, subscribers and/or web application nodes. In the context of fixed location subscribers, such information might include relatively static geographic information, such as physical address information associated with the subscriber. In the context of wireless or mobile subscribers, such information might include relatively dynamic information, such as the subscriber's current geographic location (e.g., wireless cell, wireless sector, geographic address, and/or global positioning system (GPS) coordinates). LAS 218 may utilize a location server in order to determine the geographic location of a user, subscriber, and/or web application node. For example, LAS 218 may utilize location server 224 to determine the geographic location of web application node 202.

LAS 218 may also be configured to communicate with a user profile server. For example, LAS 218 may be configured to communicate with user profile server 226. User profile server 226 may be any device capable of storing and communicating information relating to user interests. User profile server 226 may develop user profiles relating to users and/or web application nodes. For example, user profile server 226 may develop user profiles relating to users of web application node 202. User profile server 226 may glean information relating to user interests through communications with a packet inspection node. For example, user profile server 226 may glean information relating to user interests from communications with packet inspection node 216. LAS 218 may utilize user profiles stored on user profile server 226 in selecting an advertisement to communicate to a particular user and/or web application node. For example, LAS 218 may utilize user profiles stored on user profile server 226 in selecting an advertisement to communicate to web application node 202.

Figure 3A:
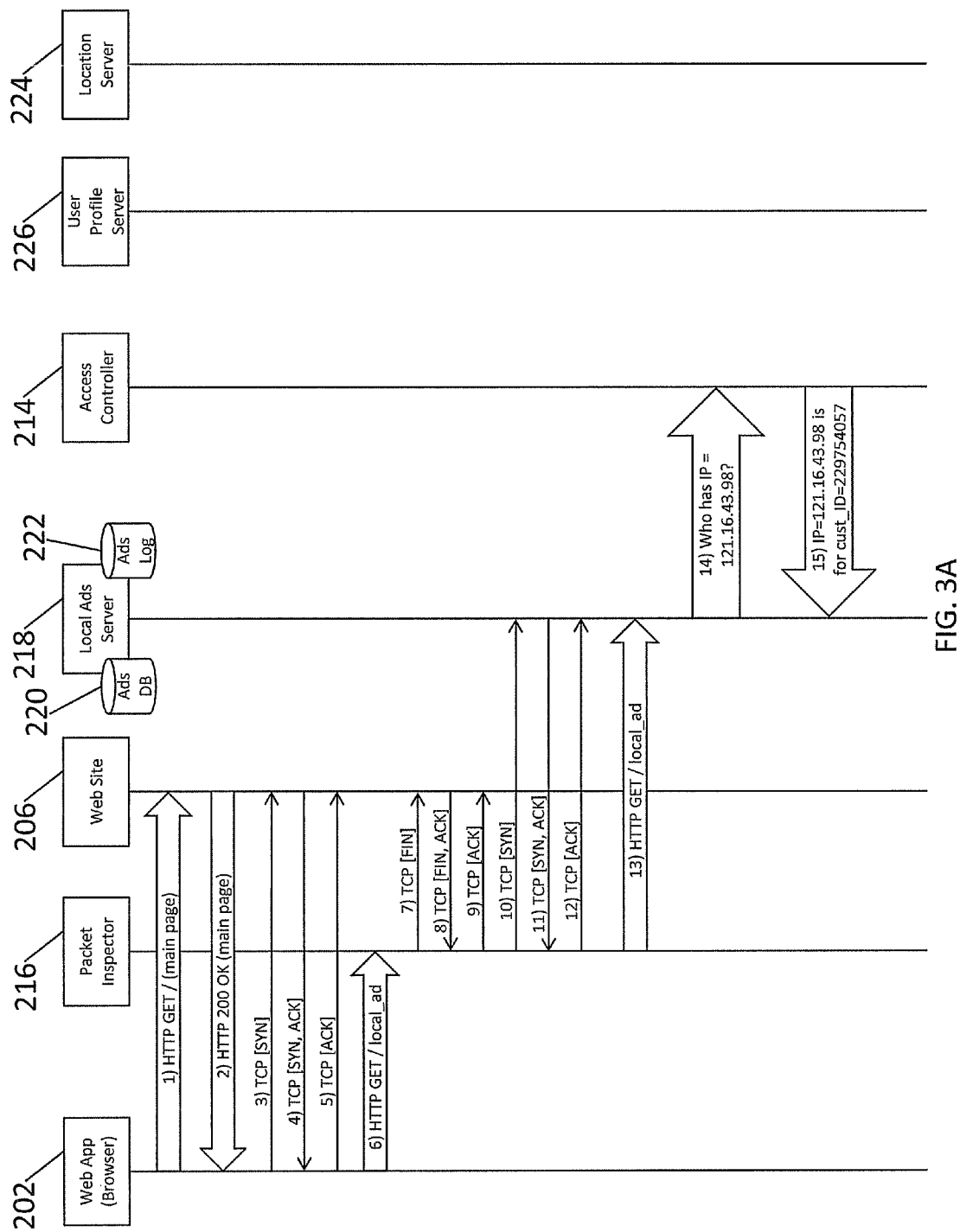
FIG. 3A is a first portion of a message flow diagram illustrating local advertisement insertion through web request redirection according to an embodiment of the subject matter described herein.
Figure 3B:
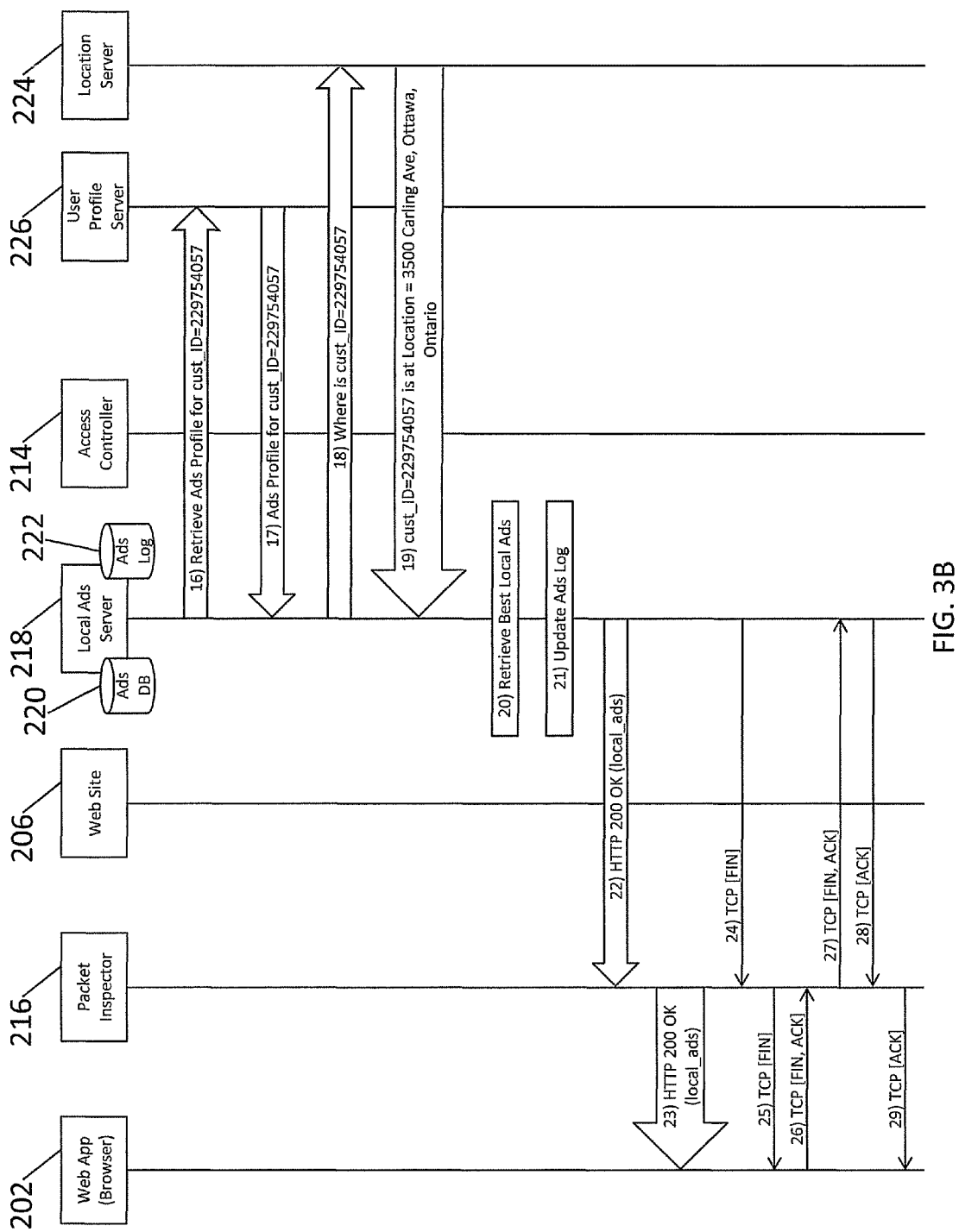
FIG. 3B is a second portion of a message flow diagram illustrating local advertisement insertion through web request redirection according to an embodiment of the subject matter described herein.

FIGS. 3A and 3B are a first and second portion of a message flow diagram illustrating local advertisement insertion through web request redirection according to an embodiment of the subject matter described herein. To simplify the description, only a subset of the content of the actual HTTP and TCP messages is shown.

Referring to FIG. 3A, at step 1, web application node 202 accesses web site node 206 to establish a hypertext transfer protocol (HTTP) exchange with web site node 206 by sending, to web site node 206, an HTTP GET request message (TCP connection setup for this HTTP exchange is not shown). Table 1 shows some of the details of the GET request message. Referring to Table 1, line 1 is the GET request, with Line 2 describing the web application type being utilized at web application node 202, e.g., "Mozilla" version "4.0." Line 3 specifies the resource locator identifying the host the GET message seeks to retrieve information from (e.g., a host associated with web site node 206).

TABLE 1

01: GET / HTTP/1.0
02: User-Agent: Mozilla/4.0
03: Host: www.localbusiness.com

At step 2, web site node 206 may send, to web application node 202, an HTTP 200 OK response message in response to the GET request, containing a "main page" associated with the host. Table 2 illustrates an exemplary HTTP 200 OK response message (only portions of the message shown). Referring to Table 2, line 1 shows the "200 OK" response code to indicate that the request has succeeded. Line 2 identifies the date and time the message was created. Line 3 identifies the format of the response message's content, in this case HTML content. Line 4 shows the start of the actual content. Line 5 shows the HTML header section (actual content not shown). Line 6 is the beginning of the body of the page. Line 7 is the start of the actual content for the HTML body (not shown). Within that HTML content, in accordance with an embodiment of the subject matter described herein, line 8 shows an example of a local ads request taking the form of an image request from a source at /local_ads. This syntax will cause the web application node 202 to initiate a new HTTP exchange to retrieve that image from source /local_ads in step 6. The keywords src="/local_ads . . . are in this embodiment the trigger that the PI node 216 uses to initiate the process of local ads insertion. The keywords src="/local_ads are just one example and many other formats or syntax are possible. In addition to the source address, Line 8 may include additional parameters specifying various aspects, such as the requested format of the local advertisement request (width=480 height=60 type=img) or the web site node client identifier (client=323139). Line 9 marks the end of the body of the page.

TABLE 2

```
01: HTTP/1.0 200 OK
02: Date: Thu, 13 Jan 2011 17:29:12 GMT
03: Content-Type: text/html
04: <HTML>
05: <HEAD>...</HEAD>.
06: <BODY>
07: <!Page content.... -->
08: <img src="/local_ads?width=480 &height=60
    &type=img &client=323139" />
09: </BODY>
```

In order to retrieve the image at source=/local_ads, web application node 202 needs to start a new TCP connection with web site node 206 by sending, to web site node 206, a TCP synchronization (SYN) message (step 3). At step 4, web site node 206 acknowledges web application node 202's message, by sending, to web application node 202, a TCP SYN with acknowledgement (ACK) message. At step 5, web application node 202 confirms establishment of the TCP session by sending, to web site node 206, a TCP ACK message. A similar process took place for the HTTP exchange in steps 1-2 but was not shown for simplicity.

With the TCP connection opened, web application node 202 sends the HTTP GET message (step 6) required to retrieve from web site node 206 the image specified in Line 8 of Table 2. An example of the step 6 HTTP GET request message is shown in Table 3 (only some portions shown). Line 1 contains the GET method for fetching the image and includes the specified parameters. Line 2 specifies information relating to the web application being utilized at web application node 202, e.g., "Mozilla" version "4.0." Line 3 specifies the referred host (i.e. the web site node 206).

TABLE 3

```
01: GET /local_ads/ local_ads?width=480
    &height=60 &type=img &client=323139 HTTP/1.0
02: User-Agent: Mozilla/4.0
03: Host: www.localbusiness.com
```

In accordance with an embodiment of the subject matter described herein, PI node 216 detects the keywords (src=/local_ads) which indicates the need to do local advertisement insertion. PI node 216 does so by constantly monitoring the HTTP traffic of web application node 202 and looking for the keywords associated with local advertisement insertion. When PI node 216 detects the HTTP GET message sent from web application node 202 to web site node 206 with the proper keywords, the PI node 216 intercepts the message and takes steps to redirect the HTTP request to LAS 218. In one embodiment, PI node 216 spoofs the TCP session that exists between web application node 202 and web site node 206. For example, at step 7, PI node 216 may send a TCP final (FIN) message to web site node 206. At step 8, web site node 206 may acknowledge PI node 216's final message with a TCP FIN with ACK message. At step 9, PI node 216 may confirm termination of the session by sending a TCP ACK message to web site node 206.

Although the PI node terminated the TCP connection as far as the web site node 206 is concerned, the PI node keeps the TCP connection active with the web application node 202. In effect, the PI node 216 spoofs web application node 202 so that PI node 216 appears to application node 202 as web site node 206. Utilizing such an embodiment enables web application node 202 to continue to receive information associated with an existing GET request.

At step 10, in order to establish a session over which to receive the local advertisement, PI node 216 initiates a TCP session with LAS 218 by sending, to LAS 218, a TCP SYN message. At step 11, LAS 218 acknowledges PI node 216's message, by sending, to PI node 216, a TCP SYN with ACK message. At step 12, PI node 216 confirms establishment of the TCP session by sending, to LAS 218, a TCP ACK message. At step 13, PI node 216 utilizes the established TCP session with LAS 218, to send, to LAS 218, an HTTP GET message requesting the local advertisement. Table 4 illustrates a portion of an exemplary HTTP GET message. Referring to Table 4, line 1 is the GET method for the local advertisement request and includes the specified parameters from Line 1 Table 3, augmented with the source IP address of the web application node 202 gathered by PI node 216. Line 2 specifies information relating to the web application being utilized at web application node 202, e.g., "Mozilla" version "4.0." Line 3 specifies the referred host (i.e. local ads server 218).

TABLE 4

```
01: GET /local_ads/ local_ads?width=480
    &height=60 &type=img &client=323139
    &src_IP=121.16.43.98
    HTTP/1.0
02: User-Agent: Mozilla/4.0
03: Host: local_ads.isp_xyz.com
```

At step 14, LAS 218 may send a message, to access controller node 214, requesting information relating to web application node 202, e.g., "what customer is associated with Internet protocol (IP) address 121.16.43.98?" At step 15, access controller node 214 may respond to LAS 218's request by sending a message containing the requested information, e.g., "IP 121.16.43.98 is associated with customer identification (ID) number 229754057." Referring to FIG. 3B, at step 16, LAS 218 may send a message, to user profile server 226, requesting a user profile for customer ID number 229754057. At step 17, user profile server 226 may respond to LAS 218's request by sending, to LAS 218, a message containing a user profile for customer ID number 229754057. At step 18, LAS 218 may send a message, to location server 224, requesting information regarding customer ID number 229754057's location. The location server 224 may use a variety of techniques to determine the user location. For a fixed broadband access, the location server may simply retrieve the street address associated with the customer ID. For wireless networks, the location server may interact with the wireless access network to retrieve the current user location using a variety of techniques such a triangulation, assisted GPS or GPS. In this example, the customer is connected via a fixed broadband connection, therefore at step 19, location server 224 responds to LAS 218's request by sending, to LAS 218, a message containing location information in the form of a street address for customer ID number 229754057, e.g., 3500 Carling Avenue, Ottawa, Ontario.

At step 20, LAS 218 may utilize the user profile provided by user profile server 226, the location information provided by location server 224, and/or the parameters specifying the format of the local advertisement requested to select an appropriate advertisement from advertisement DB 220. If LAS 218 determines that an appropriate advertisement is not available, LAS 218 may communicate, to PI node 216, a message indicating that a suitable advertisement is unavailable (not illustrated). In response to receiving a message from LAS 218 that a suitable advertisement is unavailable, PI node 216 may communicate to web application node 202 an alternative advertisement or may redirect the request to a host node associated with the request (e.g., web site node 206).

At step 21, LAS 218 may update advertisement log 222, for example, LAS 218 may update advertisement log 222 to reflect the impending communication of the selected advertisement to web application node 202. At step 22, LAS 218 sends an HTTP 200 OK response message containing the selected local advertisement to PI node 216. Table 5 illustrates an exemplary HTTP 200 OK response message. Referring to Table 5, line 1 includes the "200 OK" response code to indicate that the request has succeeded. Line 2 identifies the date and time the message was created. Line 3 identifies the length of the content to follow. Line 4 indicates that the connection should close after the transmission of 200 OK response. Line 5 indicates the format of the advertisement's content. Line 6 is the start of the data that makes up the advertisement (not shown).

TABLE 5

01: HTTP/1.1 200 OK
02: Date: Thu, 13 Jan 2011 17:29:13 GMT
03: Content-Length: 828372
04: Connection: close
05: Content-Type: image/jpeg
06: Picture data...

At step 23, PI node 216 forwards the HTTP 200 OK response message to web application node 202. In one embodiment, LAS 218 may perform a logging operation (not illustrated) to record in advertisement log 222 that the local advertisement was successfully communicated to web application node 202 and/or additional information (e.g., whether the advertisement was interacted with). At step 24, LAS 218 may begin the process of tearing down the TCP connection with PI node 216 by sending, to PI node 216, a TCP FIN message. At step 25, PI node 216 may begin the process of tearing down the TCP session with web application node 202 by sending, to web application node 202, a TCP FIN message. At step 26, web application node 202 responds to PI node 216's TCP FIN message by sending, to PI node 216, a TCP FIN with ACK message. At step 27, PI node 216 responds to LAS 218's TCP FIN message by sending, to LAS 218, a TCP FIN ACK message. At step 28, LAS 218 confirms termination of its session with PI node 216 by sending, to PI node 216, a TCP ACK message. At step 29, PI node 216 confirms termination of its session with web application node 202 by sending, to web application node 202, a TCP ACK message. In one embodiment PI node 216 and/or LAS 218 may send a message, to web site node 206, notifying web site node 206 of the communication of the local advertisement to web application node 202 (not illustrated).

Figure 4:
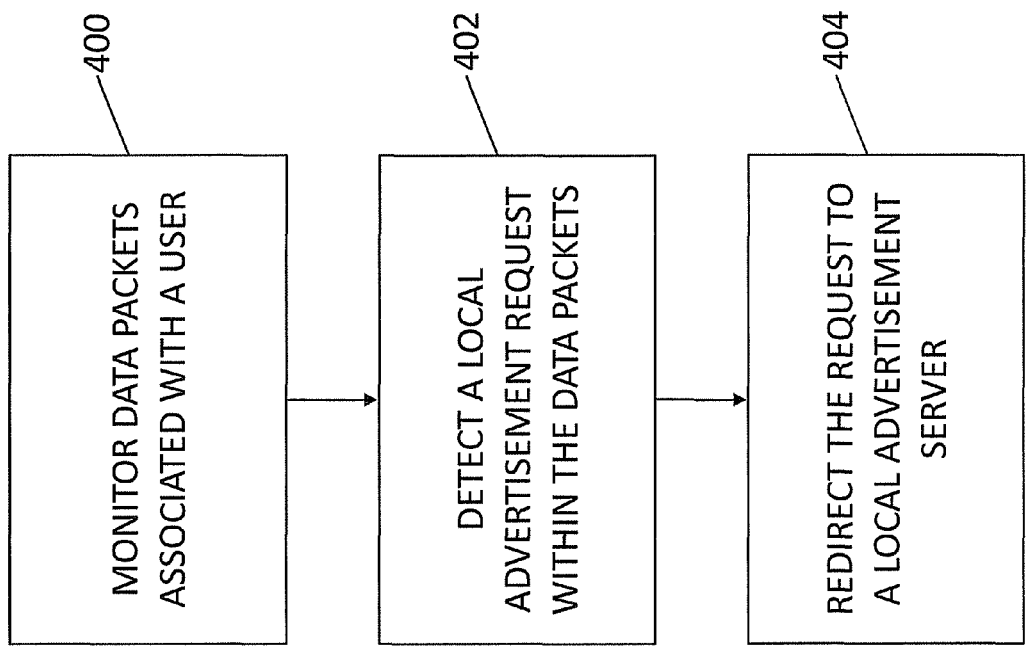
FIG. 4 is a flow chart illustrating an exemplary process for local advertisement insertion through web request redirection according to an embodiment of the subject matter described herein.

FIG. 4 is a flow chart illustrating an exemplary process for local advertisement insertion through web request redirection according to an embodiment of the subject matter described herein. Referring to FIG. 4, in step 400 a PI node monitors data packets associated with a user. For example, PI node 216 may monitor data packets associated with a user of web application node 202. In step 402, the PI node detects a local advertisement request within the data packets. For example, PI node 216 may detect a local advertisement request within data packets being sent from web application node 202 to web site node 206. In step 404, the PI node redirects the request to an LAS. For example, PI node 216 may redirect the detected local advertisement request to LAS 218.

Figure 5:
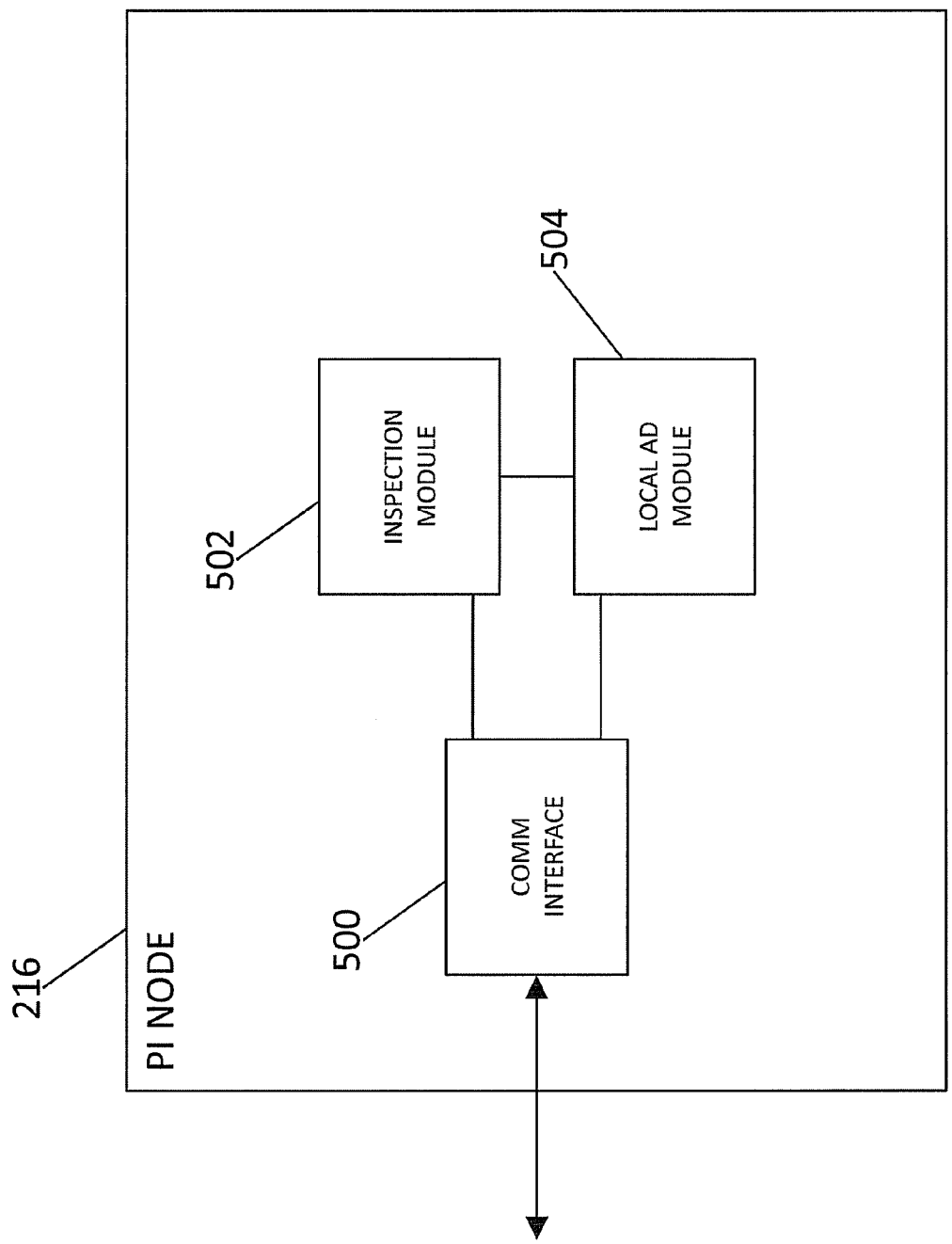
FIG. 5 is a block diagram of an exemplary PI node according to an embodiment of the subject matter described herein.

FIG. 5 is a block diagram of an exemplary PI node according to an embodiment of the subject matter described herein. Referring to FIG. 5, PI node 216 includes a communications interface for sending and receiving messages. PI node 216 also includes an inspection module 502. Inspection module 502 may be configured to monitor data packets associated with a user and detect a local advertisement request within the data packets. PI node 216 further includes a local advertisement module 504. Local advertisement module 504 may be configured to redirect the request to an LAS.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. In a packet inspection node having a processor a memory coupled to the processor, a method for communicating advertisement information, the method comprising:
   monitoring, by the packet inspection node, non-routing payload of data packets, for which the packet inspection node is not an endpoint, on a broadband access connection associated with a user;
   detecting, by the packet inspection node, a local advertisement request, wherein the local advertisement request is generated by the user based upon an advertisement trigger provided by a website node to the user, wherein the same advertisement trigger is provided to other users, and wherein the local advertisement request is within the non-routing payload of the data packets; and
   intercepting and redirecting, by the packet inspection node, the local advertisement request to a local advertisement server in response to detecting the local advertisement request within the non-routing payload of the data packets, wherein the same advertisement trigger results in each of the users receiving a different local advertisement.

2. The method of claim 1 comprising:
   receiving, from the local advertisement server, a local advertisement; and
   communicating, to a node associated with the user, the local advertisement.

3. The method of claim 1 comprising:
   receiving, from the local advertisement server a message indicating that a suitable local advertisement is unavailable; and
   communicating, to a node associated with the user, an alternative advertisement.

4. The method of claim 2 wherein the local advertisement is associated with the user's Internet connection type.

5. The method of claim 1 wherein the local advertisement request comprises a key word in a hypertext transfer protocol (HTTP) exchange.

6. The method of claim 2 wherein the local advertisement is associated with the user's geographic location.

7. The method of claim 2 wherein the local advertisement is associated with user interest information gleaned from the data packets monitored by the packet inspection node.

8. The method of claim 1 wherein the request comprises information specifying at least one of: a type for the local advertisement, a format for the local advertisement, a provider of the request.

9. The method of claim 1 wherein intercepting and redirecting the request to the local advertisement server comprises spoofing a node associated with the user so that the packet inspection node appears to the node associated with the user as a host node associated with the request.

10. The method of claim 1 wherein intercepting and redirecting the request to the local advertisement server comprises spoofing a host node associated with the request so that the packet inspection node appears to the host node associated with the request as a node associated with the user.

11. The method of claim 4 comprising:
determining the user's current location based on at least one of: a digital subscriber line (DSL) loop connection utilized by a node associated with the user, a fiber optic connection utilized by a node associated with the user, a coaxial cable connection utilized by a node associated with the user, a wireless connection utilized by a node associated with the user, a wireless cell utilized by a node associated with the user, and a wireless sector utilized by a node associated with the user.

12. The method of claim 2 comprising:
logging the communication of the local advertisement.

13. The method of claim 2 comprising:
sending notification of the communication to a host node associated with the request.

14. A packet inspection node having a processor and a memory coupled to the processor, the packet inspection node comprising:
a communications interface;
an inspection module coupled to the communications interface, the inspection module configured to:
monitor non-routing payload of data packets, for which the packet inspection node is not an endpoint, on a broadband access connection associated with a user, and
detect a local advertisement request, wherein the local advertisement request is generated by the user based upon an advertisement trigger provided by a website node to the user, wherein the same advertisement trigger is provided to other users, and wherein the local advertisement request is within the non-routing payload of the data packets; and
a local advertisement module coupled to the inspection module, the inspection module configured to:
intercept and redirect the local advertisement request to a local advertisement server in response to detection of the local advertisement request within the non-routing payload of the data packets by the inspection module, wherein the same advertisement trigger results in each of the users receiving a different local advertisement.

15. The packet inspection node of claim 14 wherein the local advertisement module is configured to:
receive, from the local advertisement server, a local advertisement; and
communicate, to a node associated with the user, the local advertisement.

16. The packet inspection node of claim 14 wherein the local advertisement module is configured to:
receive, from the local advertisement server, a message indicating that a suitable local advertisement is unavailable; and
communicate, to a node associated with the user, an alternative advertisement.

17. The packet inspection node of claim 15 wherein the local advertisement is associated with the user's Internet connection type.

18. The packet inspection node of claim 14 wherein the local advertisement request comprises a key word in a hypertext transfer protocol (HTTP) exchange.

19. The packet inspection node of claim 15 wherein the local advertisement is associated with the user's geographic location.

20. The packet inspection node of claim 15 wherein the local advertisement is associated with user interest information gleaned from the data packets monitored by the packet inspection node.

21. The packet inspection node of claim 14 wherein the request comprises information specifying at least one of: a type for the local advertisement, a format for the local advertisement, and a provider of the request.

22. The packet inspection node of claim 14 wherein the local advertisement module is configured to spoof a node associated with the user so that the packet inspection node appears to the node associated with the user as a host node associated with the request.

23. The packet inspection node of claim 14 wherein the local advertisement module is configured to spoof a host node associated with the request so that the packet inspection node appears to the host node associated with the request as a node associated with the user.

24. The packet inspection node of claim 17 comprising:
the local advertisement server configured to determine the users current location based on at least one of: a digital subscriber line (DSL) loop connection utilized by a node associated with the user, a fiber optic connection utilized by a node associated with the user, a coaxial cable connection utilized by a node associated with the user, a wireless connection utilized by a node associated with the user, a wireless cell utilized by a node associated with the user, and a wireless sector utilized by a node associated with the user.

25. The packet inspection node of claim 15 comprising:
the local advertisement server configured to log the communication of the local advertisement.

26. The packet inspection node of claim 15 comprising:
the local advertisement server configured to send notification of the communication to a host node associated with the request.

27. A non-transitory computer readable medium comprising computer executable instructions that when executed by a processor of a computer, cause the computer to:
monitor non-routing payload of data packets, for which the packet inspection node is not an endpoint, on a broadband access connection associated with a user;
detect a local advertisement request, wherein the local advertisement request is generated by the user based upon an advertisement trigger provided by a website node to the user, wherein the same advertisement trigger is provided to other users, and wherein the local advertisement request is within the non-routing payload of the data packets; and
intercept and redirecting the local advertisement request to a local advertisement server in response to detecting the local advertisement request within the non-routing payload of the data packets, wherein the same advertisement trigger results in each of the users receiving a different local advertisement.

* * * * *